June 29, 1965   F. KUHRT ETAL   3,192,471
HALL DEVICE TRANSMITTER INCLUDING A FIELD SIGNAL STORING
FOIL IN THE MAGNETIC CIRCUIT
Filed July 27, 1961
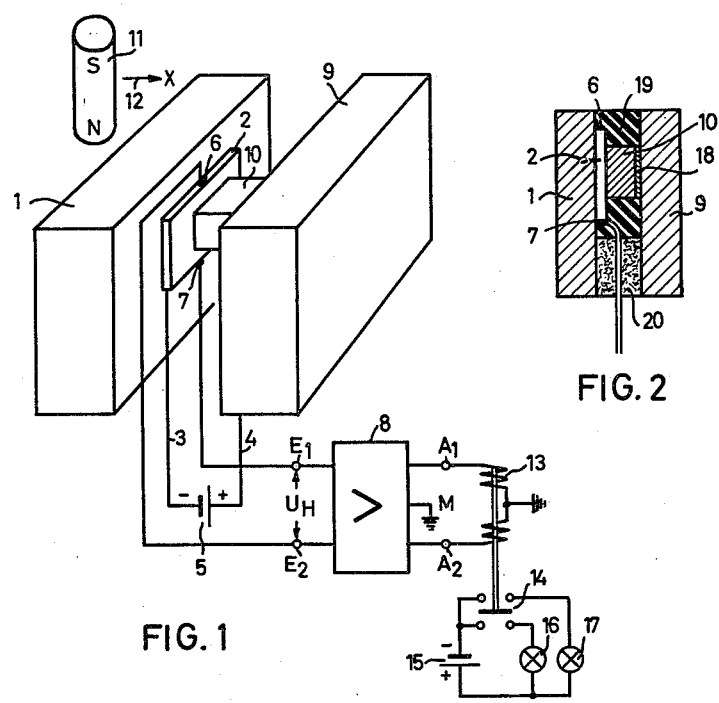
FIG. 1
FIG. 2
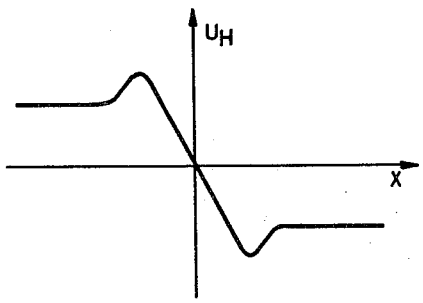
FIG. 3

United States Patent Office 3,192,471
Patented June 29, 1965

3,192,471
HALL DEVICE TRANSMITTER INCLUDING A FIELD SIGNAL STORING FOIL IN THE MAGNETIC CIRCUIT
Friedrich Kuhrt and Julius Brunner, Nurnberg, Germany, assignors to Siemens-Schuckertwerke Aktiengesellschaft, Berlin-Siemensstadt, Germany, a corporation of Germany
Filed July 27, 1961, Ser. No. 127,359
Claims priority, application Germany, Sept. 29, 1960, S 70,629
3 Claims. (Cl. 324—45)

Our invention relates to a position-responsive magnetic sensing and signal-transmitting device of the proximity type for controlling, regulating or indicating systems in hoisting and other conveying equipment, as well as in machine tools and other fabricating machinery.

In such systems, one of two relatively movable structures is provided with magnet means, such as a permanent magnet or electromagnet, whereas the other part carries a magnetically responsive transmitter in order to issue a signal voltage when the magnet, during relative travel, passes through the vicinity of a magnetically responsive sensing element of the transmitter. It has been proposed to provide such a transmitter with a Hall-voltage generator. This generator comprises a ferromagnetic core structure in which a magnetic flux is induced when the magnet is sufficiently close. A Hall plate of semiconductor material, located in a gap of the core structure and normally transversed by an electric energizing current, then generates an output signal voltage, the so-called Hall-voltage, between two probe electrodes. According to the prior proposal, the magnetizable structure of the Hall generator is generally U-shaped, the Hall plate being located midway between the legs of the U-shape, and the travel path of the flux-inducing magnet extends along the two leg ends. When the magnet approaches the Hall generator, it causes a Hall-voltage of a given polarity to be generated. This signal voltage declines to zero when the magnet is exactly opposite the Hall generator, and a voltage of the opposite polarity is generated as the magnet moves away from the Hall generator.

Some uses of such a signal transmitter make it desirable to memorize the output signal. For example, when the Hall plate is energized by current taken from a utility line so that the signal voltage will vanish in the event of line-voltage failure, it is desirable that the previous signal voltage become re-established without change in polarity upon return of the line voltage. Such memorizing is desirable, for example, for creeping-speed control signals in machine-tool control systems, hoisting equipment and other industrial applications.

It is known generally, to utilize the remanence of the ferromagnetic circuit in a Hall generator for thus storing a signal. Due to its remanence, the Hall generator, upon discontinuation of its magnetic excitation, retains a Hall-voltage signal whose polarity depends upon the direction of the proceeding magnetic excitation.

However, this principle of utilizing remanence cannot readily and not reliably be employed in signal transmitters, as heretofore proposed for proximity-systems of the above-mentioned type. This is because, for better response to the magnetic field, the Hall generators in proximity-type transmitters have been provided with relatively large pole pieces in form of metal sheets or have been given some equivalent design in which the ferromagnetic core structure has greatly different cross-sections along its flux path. In such devices, reliable storage of signals and a sufficient magnitude of such stored signals cannot be obtained by virtue of the remanence normally inherent in the ferromagnetic structure.

It is an object of our invention, therefore, to provide a magnetically responsive signal transmitter of the above-mentioned type, that is capable of memorizing the signals to a much better extent and with a better operating reliability than heretofore attained.

To this end and in accordance with a feature of my invention we provide the ferromagnetic flux path of the magnetic-field responsive sensing device with a restricted portion or isthmus member of a magnetically hard material (high-remanence) as compared with the soft-magnetic (high-permeability) material of which the main portion of the core structure is made, and we dimension the isthmus member for saturation at the maximal induction occurring during normal operation of the device. In a signal transmitter of my invention, the effective iron cross-section whose remanence is effective for signal memorizing is relatively very small in comparison with the cross-section of the main core structure.

According to other, more specific features of our invention, the transducer head of a transmitter according to the invention has a core structure composed of a ferrite base plate which carries the Hall plate, and a cover plate, also of ferrite, which is located on the opposite side of the Hall plate; and the above-mentioned isthmus member of high remanence is constituted by a bridging piece located between Hall plate and cover plate and consisting of ferrite material with a magnetizing loop characteristic of approximately rectangular shape.

According to another feature of our invention the above-mentioned high-remanence member is constituted by a foil of magnetically hard (permanent-magnet) material which is inserted into the flux path of the ferromagnetic core structure and extends in a direction transverse to the flux path. Preferably, the foil is inserted between the above-mentioned ferrite bridge piece and the cover plate.

The invention will be further described with reference to the embodiment of a signal transmitter according to the invention illustrated by way of example in the accompanying drawing, in which:

FIG. 1 is an exploded perspective view of the transmitter and of an appertaining permanent magnet, in conjunction with an example of a schematic circuit diagram;

FIG. 2 is a cross-section of the same transmitter; and

FIG. 3 is an explanatory graph relating to the same transmitter.

The illustrated transmitter comprises a base plate 1 of ferrite on which a Hall plate 2 is located in face-to-face relation thereto. The Hall plate 2 consists of a rectangular wafer of semiconductor material and has two current supply electrodes extending along the two narrow sides over the entire width of the wafer. The wafer is further provided with two probe electrodes (Hall electrodes) 6 and 7 on the respective two long sides of the wafer midway between the two current supply terminals. During operation, the Hall wafer is traversed by electric current supplied to the terminals through respective leads 3 and 4 from a direct-current source schematically represented at 5. As a rule, the current source 5 is constituted by a power-supply unit energizable from a utility power line. The two Hall electrodes 6 and 7 furnish a Hall voltage $U_H$ when the transmitter responds to a magnetic field. The Hall voltage is applied to the input terminals $E_1$ and $E_2$ of an amplifier 8.

Located between the ferrite base plate 1 and a cover plate 9 also of ferrite, is a bridge piece 10 which also consists of ferrite but has high remanence in comparison with the low remanence of the plates 1 and 9. The base plate 1 and the cover plate 9 may, for example, consist of zinc manganese ferrite, and the ferrite bridge piece 10 may consist of barium oxide ferrite. The Hall wafer 2 is preferably made of indium arsenide or indium antimonide.

The magnetic excitation for the transmitter is provided by a permanent magnet 11, consisting for example of a sintered oxide magnet. During operation of the system the magnet travels along the transducer head in the direction of the arrow 12, or in the opposite direction. The travel direction coincides with the direction of mutual spacing between the ferrite plate members 1 and 9 substantially perpendicular to the planes of the opposing faces of said ferrite plate members.

It will be understood that the illustration in FIGS. 1 and 2 is on an enlarged scale. Actually the base plate 1 and the cover plate 9 may have the size of 10 x 6 x 2 mm., for example; and the distance of the Hall electrode 6 from the upper edge of the base plate 1 may be approximately 1 mm.

FIG. 1 also illustrates a simple example of utilizing the Hall-voltage signal. As mentioned, the Hall voltage is supplied to an amplifier 8 which may comprise an impedence matching stage and a trigger stage. A suitable push-pull transistor amplifier of this type is illustrated, for example, in the German periodical Elektrotechnische Zeitschrift (ETZ–A) of April 1960, page 326, Fig. 8. Available at the output terminal $A_1$ and $A_2$, of the amplifier 8 are signal voltages versus a grounded connection M. These signal voltages are dependent upon the polarity of the Hall voltage $U_H$. In the illustrated example, the two excitation windings of a polarized relay 13 are connected to the amplifier output terminals. The relay is normally in the illustrated midposition. A contact 14 of the relay closes the circuit of a current source 15 either through a lamp 16 or a lamp 17 which indicates at which side of the transducer the magnet 11 is located at a time. If desired, of course, the signal appearing at the output terminals of the amplifier 8 may be used for the operation of other indicating or control devices, for example for the control of logic elements serving to issue commands for the change in speed of a drive motor or for other control purposes.

As apparent from the cross-section shown in FIG. 2, a foil 18 of magnetically hard (permanent-magnet) material may be additionally disposed between the ferrite bridge piece 10 and the ferrite cover plate 9. The foil 18 functions to store a signal. If the external magnetization is removed or becomes ineffective, the high remanence foil 18 continues to produce a magnetic flux known as an internal flux. The foil 18 may consist of an aluminum cobalt-nickel alloy, for example. As shown at 19 in FIG. 2, the space between base plate and cover plate may be filled with insulating material, for example a casting resin or the like synthetic material. The connecting leads for the current supply terminals of the Hall wafer 2 and for the Hall electrodes 6 and 7 are preferably passed through a spacer piece 20 of non-magnetic material, for example a ceramic substance. That is, when the magnet 11 is in a plane through the center of the long sides of the Hall device wafer parallel to the planes of the opposing faces of the ferrite plate members 1 and 9, the Hall voltage is equal to zero.

The diagram in FIG. 3 shows the dependence of the Hall voltage $U_H$ upon the position of the field magnet 11 along its travel path $x$. When the magnet is accurately opposite the transducer head, the Hall voltage is equal to zero. It increases in both directions up to a maximum and, during further travel motions of the magnet, retains a value determined by the remanence of the ferrite bridge piece 10, or also by the remanence of the high-remanence foil 18.

In the event of line-voltage failure, i.e. when the source 5 does not supply an energizing current through the Hall wafer, the Hall voltage $U_H$ vanishes. However, as soon as the line-voltage returns, the Hall voltage also returns and retains the value and polarity of the previously effective signal. This is accomplished by the signal transmitter of the present invention, in which the foil 18 preserves a remanent inductive flux in the magnetic circuit of the Hall device. The remanent inductive flux stored by the foil 18 is a contributory cause for the production of the Hall voltage $U_H$. Thus, although the external magnetization is then removed or becomes ineffective, the operation of the signal transmitter is not impaired. Consequently, in the embodiment described, the one lamp 16 or 17 that was in operation prior to the line-voltage failure will again be energized.

We claim:

1. A signal transmitter for response to proximity of a magnet, comprising ferromagnetic structure of low-remanence material forming a path for magnetic flux due to proximity of said magnet, said ferromagnetic structure comprising spaced ferromagnetic plates, a Hall plate for generating a Hall voltage signal, said Hall plate being disposed adjacent one of said ferromagnetic plates between said ferromagnetic plates in said flux path and having an input current-supply circuit and Hall voltage output electrodes for providing said Hall-voltage signal between said electrodes, and a bridge member of high-remanence material forming an isthmus in said flux path, said bridge member including a foil of high remanence material adjacent the other of said ferromagnetic plates, said bridge member having one end in contact with said Hall plate and its opposite spaced end in contact with said foil.

2. A signal transmitter for response to proximity of a magnet, as claimed in claim 1, wherein said bridge member has an approximately rectangular magnetizing characteristic and a cross-sectional area substantially smaller than the cross-sectional areas of said spaced ferromagnetic plates.

3. A signal transmitter as claimed in claim 2, wherein said bridge member is substantially perpendicular to the opposing faces of said spaced ferromagnetic plates.

References Cited by the Examiner

UNITED STATES PATENTS

| | | | |
|---|---|---|---|
| 2,536,805 | 1/51 | Hansen | 324—45 X |
| 2,536,806 | 1/51 | Hansen | 324—45 X |
| 2,964,738 | 12/60 | Barney et al. | 324—45 |
| 2,987,669 | 6/61 | Kallmann | 324—45 |
| 3,037,199 | 5/62 | Grant | 324—45 X |
| 3,046,361 | 7/62 | Wiehl | 324—45 |

WALTER L. CARLSON, *Primary Examiner.*

FREDERICK M. STRADER, *Examiner.*